United States Patent
Lavelle et al.

(10) Patent No.: US 7,354,091 B2
(45) Date of Patent: Apr. 8, 2008

(54) SEAT MOUNTABLE ENTERTAINMENT SYSTEM

(75) Inventors: Patrick M. Lavelle, Sayville, NY (US); James R. Tranchina, Dix Hills, NY (US); George C. Schedivy, Aquebogue, NY (US)

(73) Assignee: Audiovox Corporation, Hauppauge, NY (US)

( * ) Notice: Subject to any disclaimer, the term of this patent is extended or adjusted under 35 U.S.C. 154(b) by 106 days.

(21) Appl. No.: 10/969,484

(22) Filed: Oct. 20, 2004

(65) Prior Publication Data
US 2005/0052046 A1    Mar. 10, 2005

Related U.S. Application Data

(63) Continuation-in-part of application No. 10/699,334, filed on Oct. 31, 2003, now Pat. No. 6,899,365, which is a continuation-in-part of application No. 10/438,724, filed on May 15, 2003.

(51) Int. Cl.
*B60N 99/00* (2006.01)

(52) U.S. Cl. .............. 296/37.15; 297/188.04; 297/188.06; 348/837

(58) Field of Classification Search ........... 297/217.1, 297/217.3, 188.04, 188.05, 188.06; 296/37.1, 296/37.7, 37.8, 37.12, 37.15, 37.16, 37.6; 348/836, 837, 839
See application file for complete search history.

(56) References Cited

U.S. PATENT DOCUMENTS

| | | | |
|---|---|---|---|
| 3,019,050 A | 1/1962 | Speilman | 297/217.3 |
| 4,681,366 A | 7/1987 | Lobanoff | 297/191 |
| 4,702,519 A * | 10/1987 | Lobanoff | 297/217.1 |
| 4,756,528 A | 7/1988 | Umashankar | 273/1 |
| 4,843,477 A | 6/1989 | Mizutani et al. | 358/248 |
| 5,214,514 A | 5/1993 | Haberkern | |
| 5,267,775 A | 12/1993 | Nguyen | 297/217.3 |
| 5,396,340 A | 3/1995 | Ishii et al. | |
| 5,507,556 A | 4/1996 | Dixon | 297/217.3 |
| 5,555,466 A | 9/1996 | Scribner et al. | 348/8 |
| 5,842,715 A | 12/1998 | Jones | 297/217.3 |
| 5,949,345 A | 9/1999 | Beckert et al. | 340/815.41 |
| 6,092,705 A * | 7/2000 | Meritt | 296/37.15 |
| D438,853 S | 3/2001 | Iino | D14/136 |
| 6,216,927 B1 | 4/2001 | Meritt | 296/37.16 |
| 6,339,455 B1 | 1/2002 | Allan et al. | |
| 6,409,242 B1 | 6/2002 | Chang | 296/37.7 |
| 6,739,654 B1 * | 5/2004 | Shen et al. | 297/188.04 |
| 6,871,356 B2 | 3/2005 | Chang | 725/75 |
| 7,036,879 B2 * | 5/2006 | Chang | 297/217.3 |
| 2003/0111880 A1 | 6/2003 | Lambiaso | 297/217.3 |
| 2003/0137584 A1 | 7/2003 | Norvell et al. | 348/61 |
| 2003/0184137 A1 | 10/2003 | Jost | 297/219.1 |

(Continued)

FOREIGN PATENT DOCUMENTS

FR    2 829 980    3/2003

(Continued)

*Primary Examiner*—Lori L. Lyjak
(74) *Attorney, Agent, or Firm*—F. Chau & Assoc. LLC

(57) ABSTRACT

An entertainment system comprises a media source, and a housing for supporting the media source, wherein the housing is coupled to an inner portion of a seat of a vehicle, and the media source is capable of being selectively connected to and disconnected from the housing.

34 Claims, 16 Drawing Sheets

U.S. PATENT DOCUMENTS

| | | | |
|---|---|---|---|
| 2003/0193619 A1 | 10/2003 | Farrand | 348/731 |
| 2003/0194968 A1 | 10/2003 | Young | 455/45 |
| 2003/0220091 A1 | 11/2003 | Farrand et al. | 455/404.1 |
| 2004/0007906 A1 | 1/2004 | Park et al. | 297/217.3 |
| 2004/0130616 A1 | 7/2004 | Tseng | |
| 2006/0112144 A1 | 5/2006 | Ireton | |

FOREIGN PATENT DOCUMENTS

| | | |
|---|---|---|
| JP | 2001-047921 | 2/2001 |
| WO | WO 02/074577 A1 | 9/2002 |
| WO | WO 03/029050 A1 | 4/2003 |

\* cited by examiner

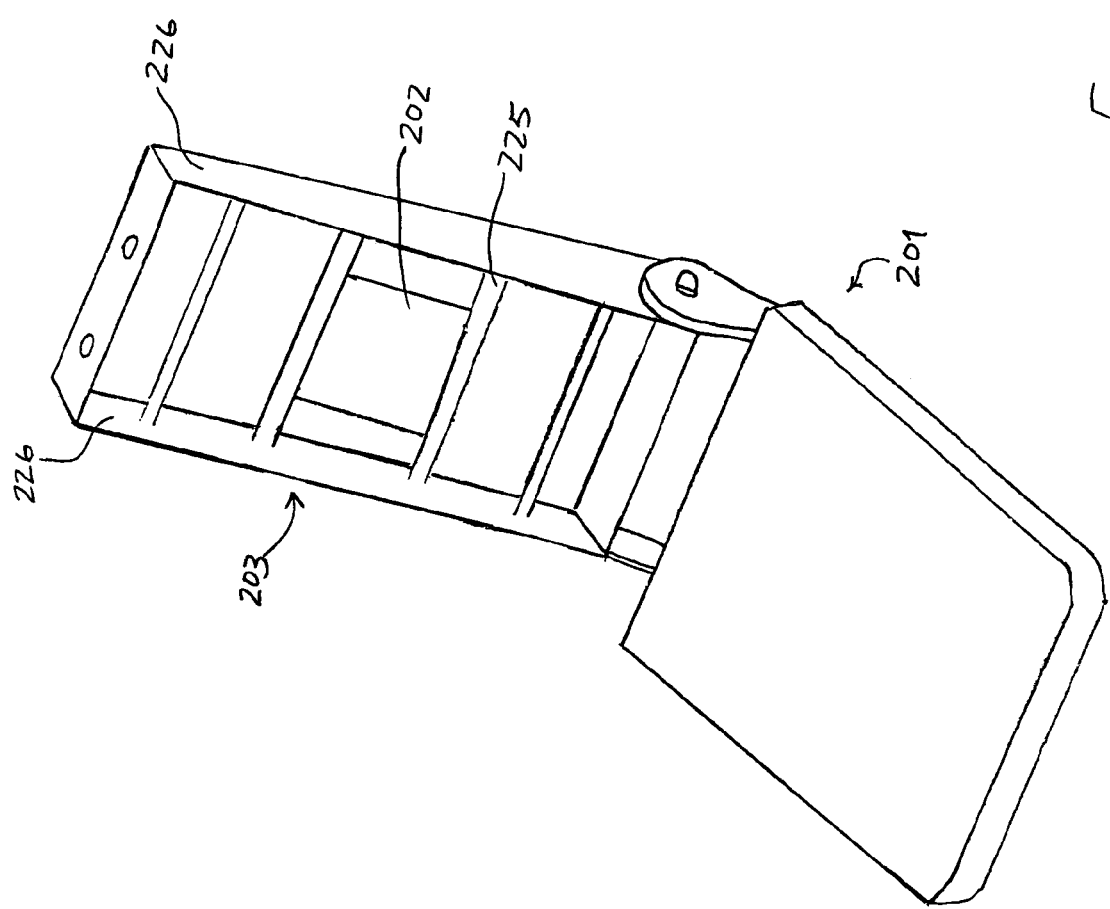

SEAT MOUNTABLE ENTERTAINMENT SYSTEM

CROSS-REFERENCE TO RELATED APPLICATIONS

This application is a Continuation-In-Part of U.S. application Ser. No. 10/699,334, filed on Oct. 31, 2003 now U.S. Pat. No. 6,899,365, which is a Continuation-In-Part of U.S. application Ser. No. 10/438,724, filed on May 15, 2003. The disclosures of U.S. application Ser. No. 10/699,334 and U.S. application Ser. No. 10/438,724 are incorporated herein in their entirety by reference.

BACKGROUND OF THE INVENTION

1. Technical Field

The present disclosure relates to an entertainment system, and more particularly to an entertainment system capable of being mounted to a seat.

2. Discussion of Related Art

As society becomes more mobile and therefore spends a greater amount of time traveling and away from home, demand rises for electronic appliances and devices outside the home environment. For example, as shown in FIGS. 1 and 2, video screens 101 have been mounted in the headrests 102 of vehicles, facilitating video entertainment on the road. These video screens may be connected to a media source located, for example, in the glove box or console of the vehicle. In this configuration, the media source occupies space in the vehicle that could otherwise be used for alternate purposes, such as storage.

Therefore, a need exists for a configuration of an entertainment system that includes space for housing a media source located on the seat of the vehicle.

SUMMARY OF THE INVENTION

A housing adapted to secure a removable media source to a seat in a vehicle, in accordance with an embodiment of the present invention, includes a means for securing the housing to an internal support structure of the seat, and a means for securing the removable media source to the housing.

The means for securing the housing may comprise at least one of a screw, a catch and an adhesive. The means for securing the removable media source may comprise a quick release mechanism, a flexible coupling mechanism including concave and convex portions, Velcro or a snap.

The removable media source may include at least one of a DVD player, a CD-ROM player, a video game player, a videocassette player, a television tuner, a radio tuner, a wireless receiver, an MP3 player, a digital video recorder, and a device for playing media supplied from a mass storage device. The housing may be mounted in one of a headrest and a main body of the seat. A display may be operatively coupled to the removable media source, wherein the display is one of handheld, mounted to the housing and mounted at a location in the vehicle away from the housing. The display may be operatively coupled to the removable media source via at least one of a direct connection, a connection through the housing and a wireless connection. The removable media source may be electrically coupled to the housing. Power may be provided to the removable media source from a power source coupled to the housing. Video data may be transferred from the removable media source to the housing for distribution to at least one display. Audio data may be transferred from the removable media source to the housing for distribution to at least one of at least one speaker and at least one headphone set.

The media source may wirelessly transmit at least one of audio and video data to a receiving device capable of downloading and storing at least one of the audio and video data.

An entertainment system, in accordance with an embodiment of the present invention, includes a media source, and a housing for supporting the media source, wherein at least a portion of the housing is mounted in a vehicle seat, and the media source is capable of being selectively connected to and disconnected from the housing.

The media source may transmit audio and video data via wireless transmission to a display device. The audio and video data may include at least two media programs transmitted in a broadcast stream. Selection of one of the at least two media programs may be made from a menu displayed on the display device. The media source may be capable of downloading and storing audio and video data.

The media source may transmit at least one of audio and video data to a receiving device. The receiving device may be one of a cellular telephone, a personal computer, an MP3 player, a personal digital assistant, a digital video recorder, and a mass storage device. The media source and the receiving device may be each capable of downloading and storing at least one of the audio and video data. The media source may transmit the audio and video data to the receiving device via one of wired and wireless transmission. The audio and video data may include at least two media programs transmitted to the receiving device in a broadcast stream, wherein selection of one of the at least two media programs is made from a menu displayed on the receiving device.

At least one of audio and video data may be capable of being transmitted from the media source to a receiving device and to the media source from the receiving device. The audio and video data may be transmitted between the media source and the receiving device via one of wired and wireless transmission. The audio and video data received by the media source from the receiving device may be transmitted to a display device from the media source.

A housing adapted to secure a removable media source to a seat in a vehicle, in accordance with another embodiment of the present invention, comprises a means for securing the housing to the seat, and a means for securing the removable media source to the housing.

The means for securing the housing may comprise at least one of a screw, a catch and an adhesive for engaging an internal support structure of the seat, or at least one of an adhesive, a rivet or Velcro for engaging a portion of upholstery of the seat.

BRIEF DESCRIPTION OF THE DRAWINGS

Preferred embodiments of the present invention will be described below in more detail, with reference to the accompanying drawings:

FIG. 5 shows a housing attached to an internal support structure of a seat according to an embodiment of the present invention;

DETAILED DESCRIPTION OF THE PREFERRED EMBODIMENTS

Figure 1:
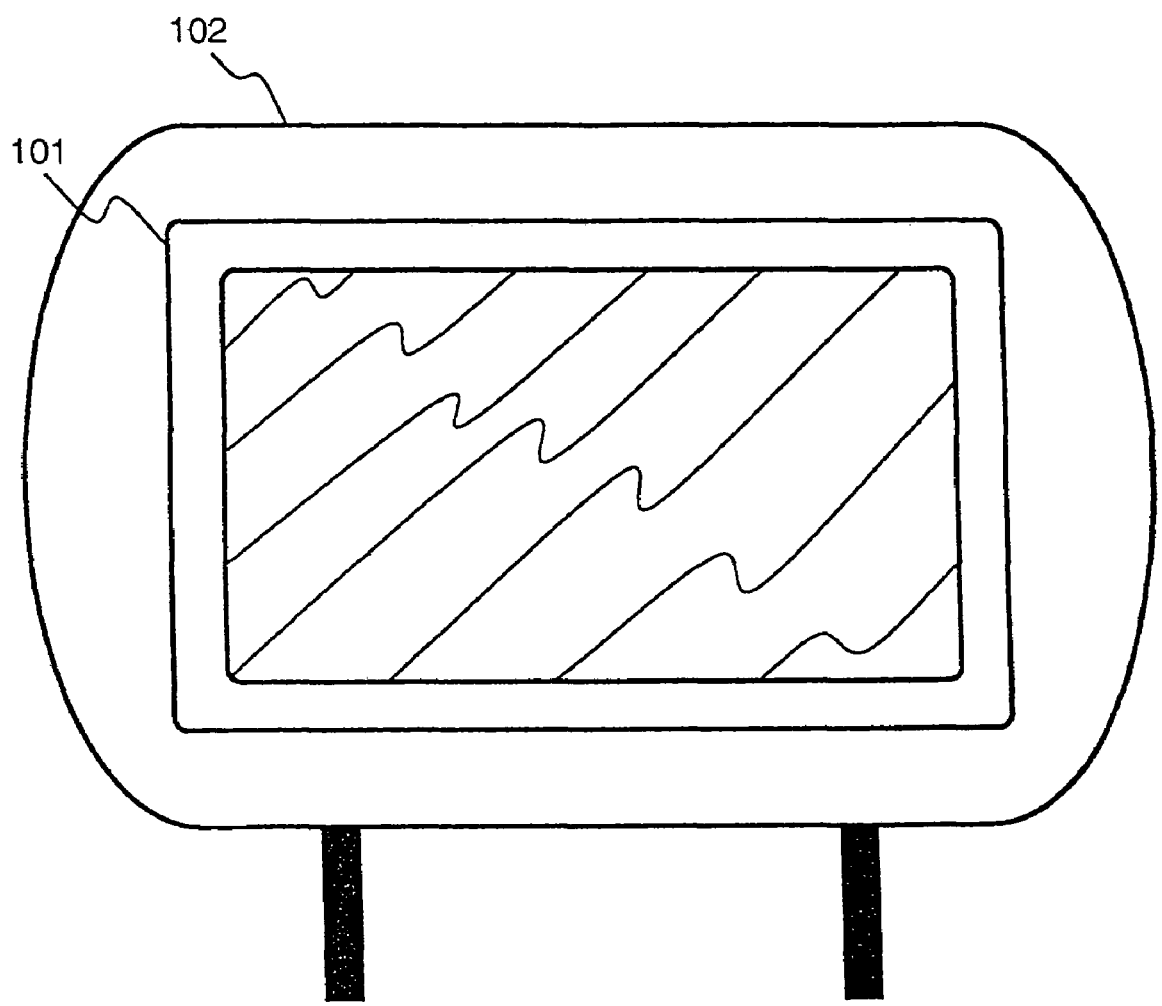
FIG. 1 is an illustration of a video screen installed in a vehicle headrest.
Figure 2:
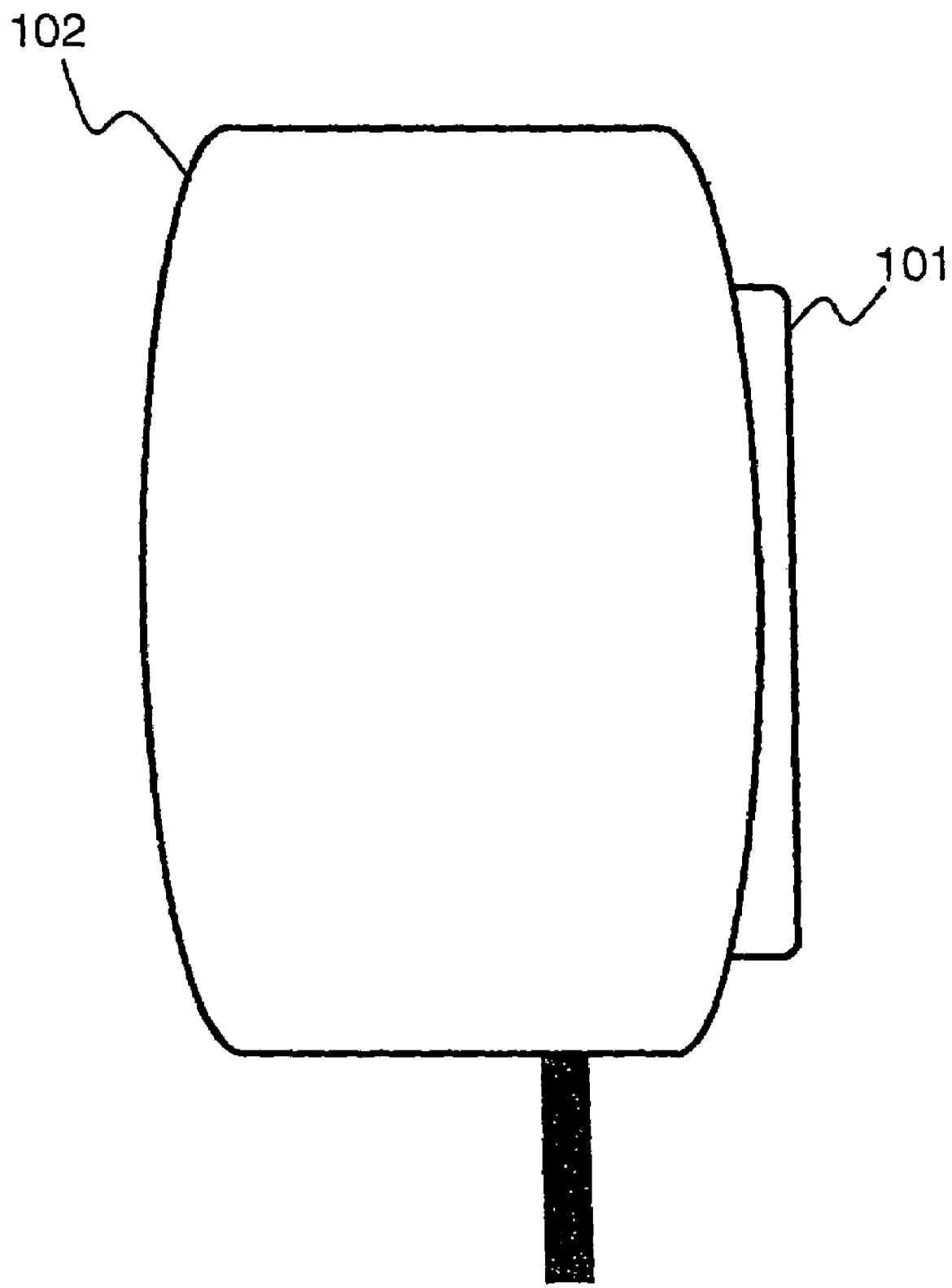
FIG. 2 is an illustration of a video screen installed in a vehicle headrest.
Figure 3:
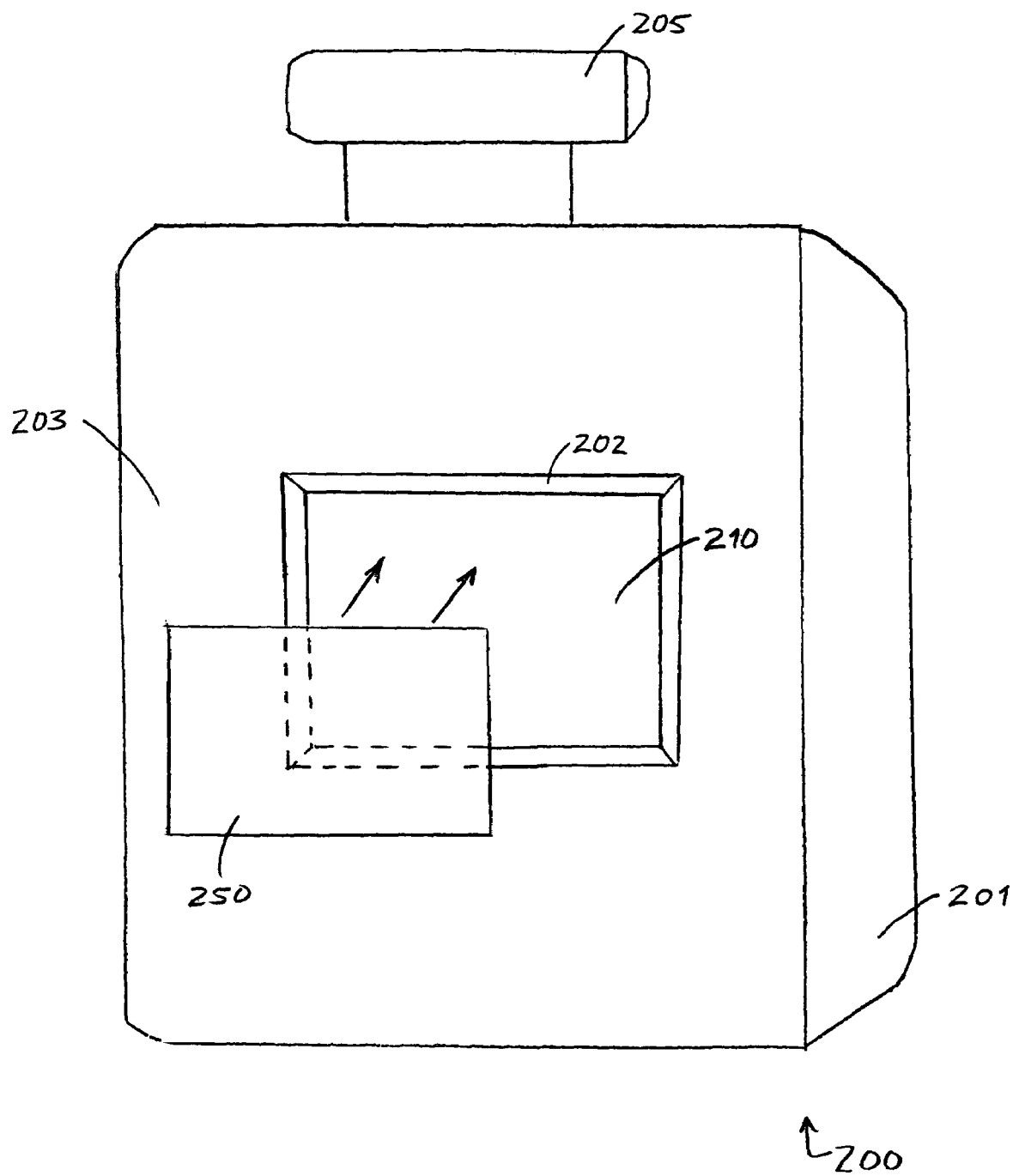
FIG. 3 shows an entertainment system according to an embodiment of the present invention.
Figure 4:
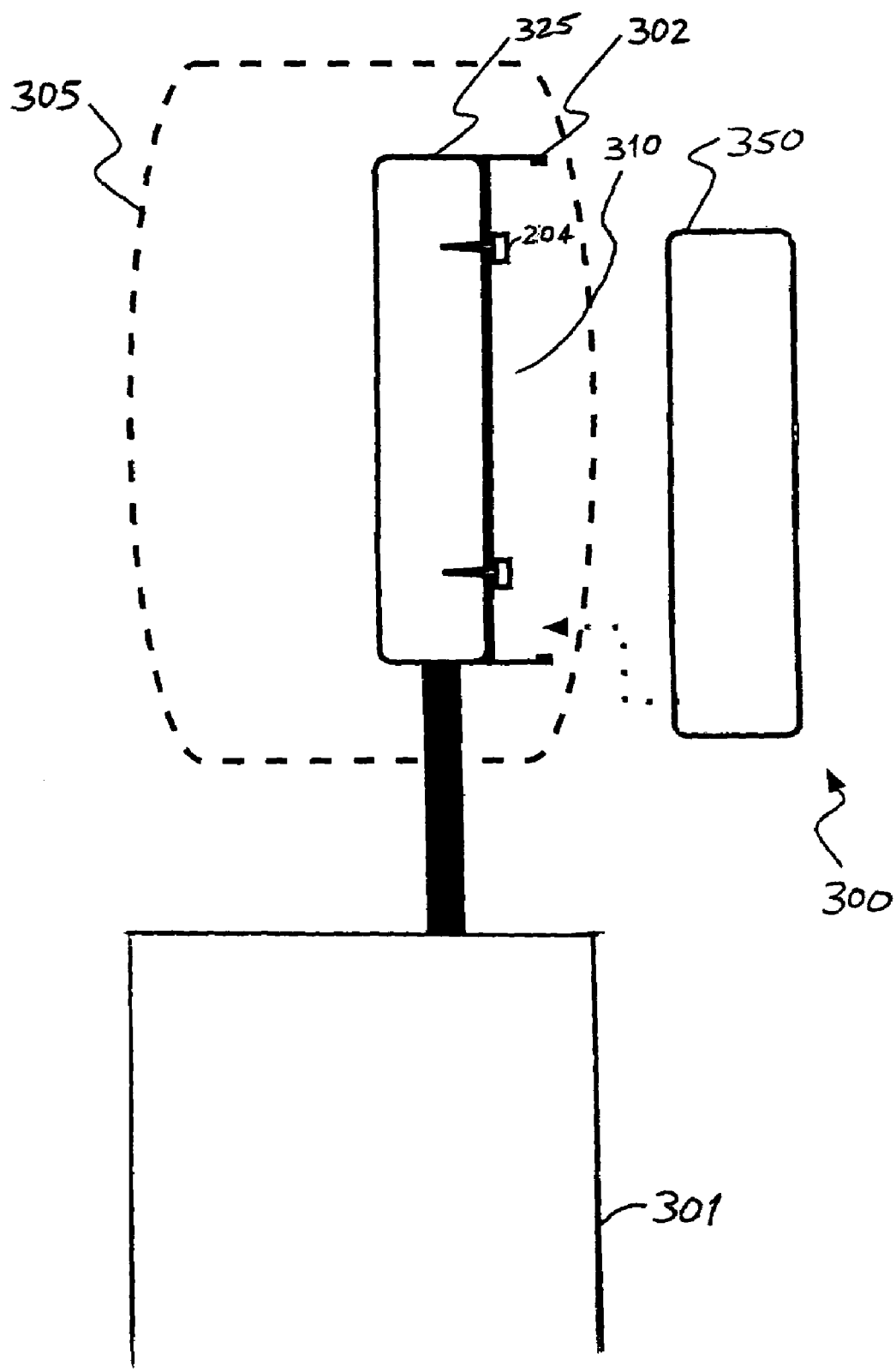
FIG. 4 shows an entertainment system according to an embodiment of the present invention.

Referring to FIG. 3, an entertainment system 200 is shown, wherein a housing 202 for a media source 250 is integrated into a vehicle seat 201 at, for example, the main body 203 of the seat 201. As shown in FIG. 4, an entertainment system 300 includes a housing 302 for a media source 350 that is integrated into the headrest 305 of a vehicle seat 301.

The media sources 250, 350 may include, for example, a DVD player, a CD-ROM player, a video game player, a videocassette player (VCP), a television or radio tuner, a wireless receiver for playing media received via wireless techniques such as 802.11, Bluetooth®, cellular transmission, including Code Division Multiple Access (CDMA) or other technology using spread-spectrum techniques, and satellite transmission, an MP3 player, or a digital video recorder (DVR) or similar device capable of downloading, recording, storing (e.g., on a storage device, such as a hard disk) and/or playing video and/or audio files or programs. The media sources 250, 350 may also include a device for playing media supplied from a mass storage device, wherein the mass storage device includes, for example, a memory card or a keydrive. The media sources 250, 350 may also include any combination of the above media sources. If a media source requires insertion of a data media, such as a DVD, the media source can be a clamshell-type device, wherein a data media is inserted into the media source through a cover, for example, positioned on the top of the device (FIG. 10D), a slot-type device, wherein a data media is inserted through a slot in the media source, a drawer-type device including a drawer and a spindle for securing a data media in place, or any other device configured to receive a data media.

Figure 6A:
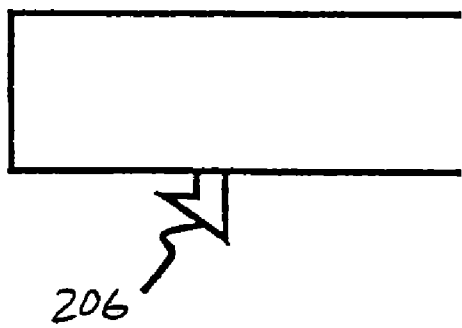
FIGS. 6A-6B show mechanisms for installing an entertainment system according to an embodiment of the present invention.
Figure 6B:
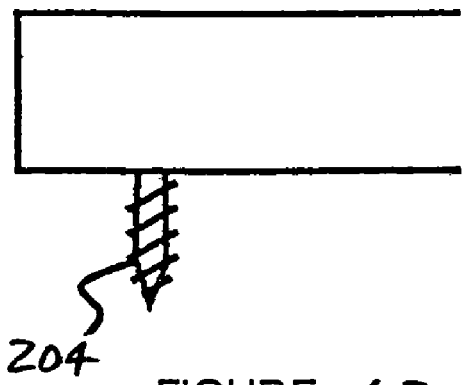

As shown in FIGS. 4 and 6A-6B, the housings 202, 302 can be fixed to the vehicle seats 201, 301 by, for example, screws 204, catches 206, adhesives, including, for example, epoxies, glues, cements, tapes and/or any other means known to those skilled in the art. As shown in FIG. 4, the housing 302 can be secured to an internal support structure 325 of the headrest 305. Alternatively, as shown in FIG. 5, the housing 202 may be secured to internal structures 225, 226 of the main body 203 of the vehicle seat 201. As an alternative to mounting to an internal support structure, the housings 202, 302 may be attached (e.g., using adhesive, such as epoxy, glue, cement or tape, rivets, or Velcro) to a portion of the upholstery within the seat body or headrest.

The media sources 250, 350 can be permanently fixed in a cavity or open portion 210, 310 of the housings 202, 302 by any acceptable means known to those skilled in the art, such as by screws, catches, adhesives, molding and pressure fitting. The media sources 250, 350 are preferably capable of being selectively inserted and mounted in the cavities 210, 310 and removable therefrom. The media sources 250, 350 may be selectively housed in the cavities 210, 310 so that they are replaceable with different media sources operating with the same or different types of media.

Figure 7A:
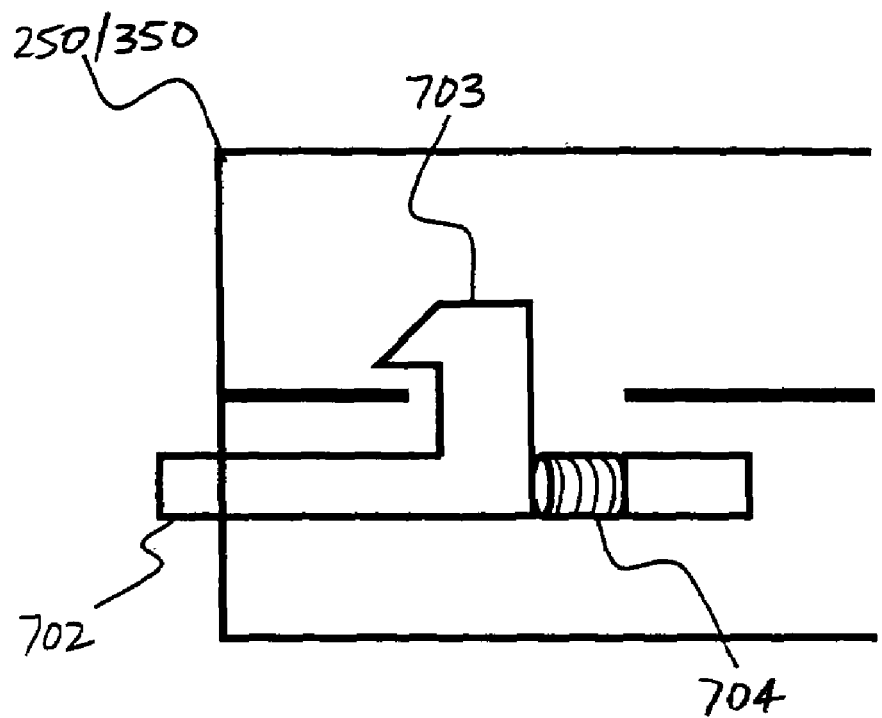
FIGS. 7A-7D show mechanisms for installing an entertainment system according to an embodiment of the present invention.

Referring to FIG. 7A, the housings 202, 302 include a quick release mechanism for securing and releasing the media sources 250, 350. The quick release mechanism can include a button 702 for releasing a latch 703, which is secured to the media source 250, 350 by pressing the media source 250, 350 securely into the cavity 210, 310. A latch mechanism includes a latch 703 that passes into, for example, a bottom portion of a wall of the media source 250, 350. The latch 703 is momentarily displaced as the media source 250, 350 is inserted into the cavity 210, 310. A spring 704 secures the latch 703 in the bottom portion of the media source 250, 350. The button 702 can be pressed, aligning the latch 703 with an opening in the bottom portion of the media source 250, 350, and the media source 250, 350 can be pulled away from the housing 202, 302.

Figure 7B:
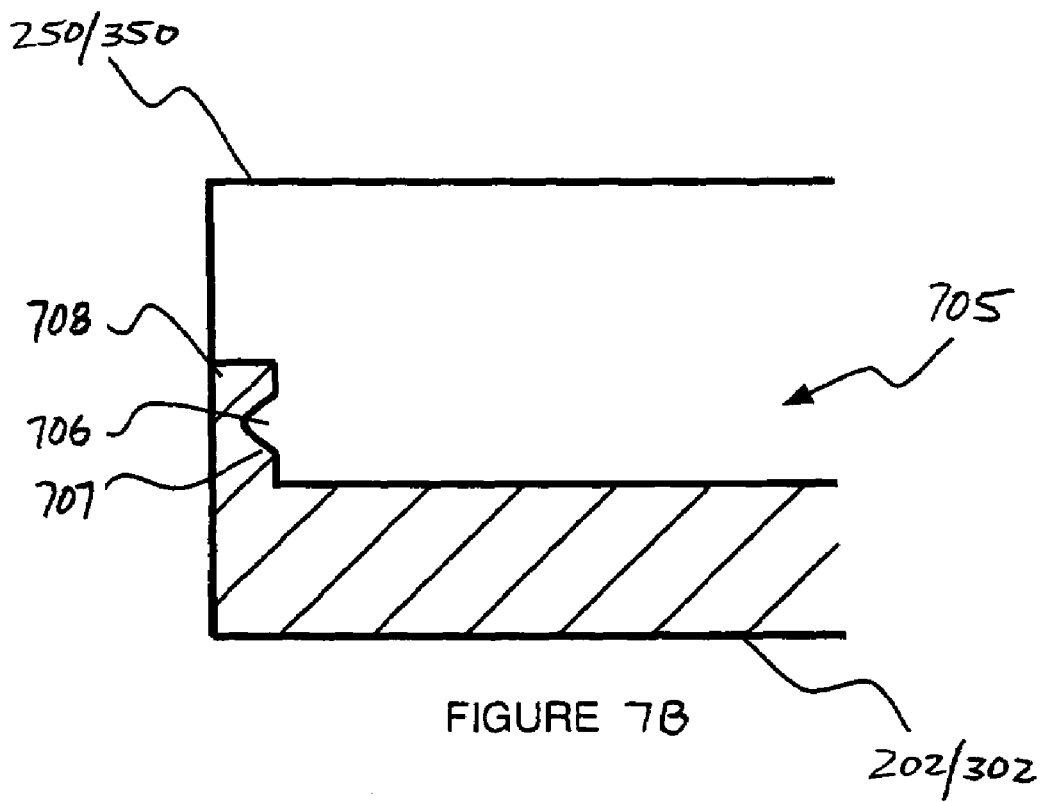

As shown in FIG. 7B, a rear portion 705 of the media source 250, 350 can be secured by a convex portion 706 that fits within a concave portion 707 in the housing 202, 302. As the media source 250, 350 is pressed into the cavity 210, 310, a wall 708 of the housing 202, 302 flexes away from the rear portion of the media source 250, 350 until the convex portion 706 is aligned with the concave portion 707. The convex portion 706 and the concave portion 707 cooperate to secure the media source 250, 350 in the cavity 210, 310 of the housing 202, 400. Thus, a wall 708 of the housing 202, 302 surrounding the cavity 210, 310 can be formed of, for example, a flexible thermoplastic rubber.

Figure 7C:
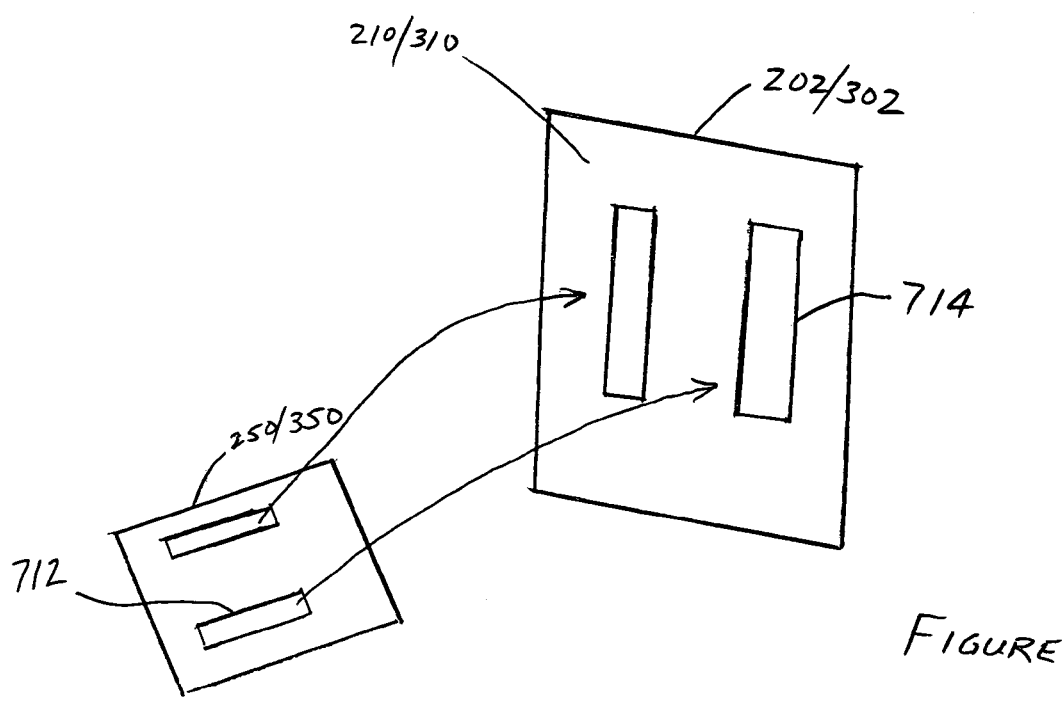
Figure 7D:
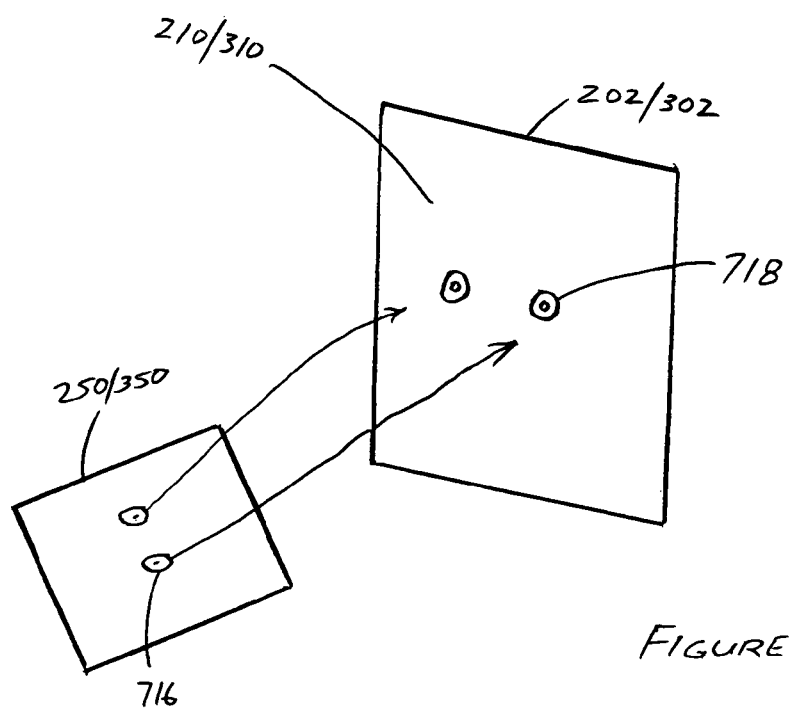

Other means of securing the media source 250, 350 in the cavity 210, 310 of the housing 202, 302 are contemplated, such as, snaps, Velcro and the like. As shown in FIG. 7C, Velcro strips 712 are fixed to a wall of the media source 250, 350 for mating with pads 714 fixed to the housing 202, 302 to secure the media source 250, 350 in the cavity 210, 310 of the housing 202, 302. As shown in FIG. 7D, magnetic or non-magnetic snaps 716 are fixed to a wall of the media source 250, 350 for mating with recesses 718 fixed to the housing 202, 302 for receiving the snaps to secure the media source 250, 350 in the cavity 210, 310 of the housing 202, 302. It is to be understood that the Velcro strips 712 and the snaps 716 may be fixed to the housing 202, 302, while the pads 714 and the recesses 718 are fixed to the media source 250, 350.

Figure 8A:
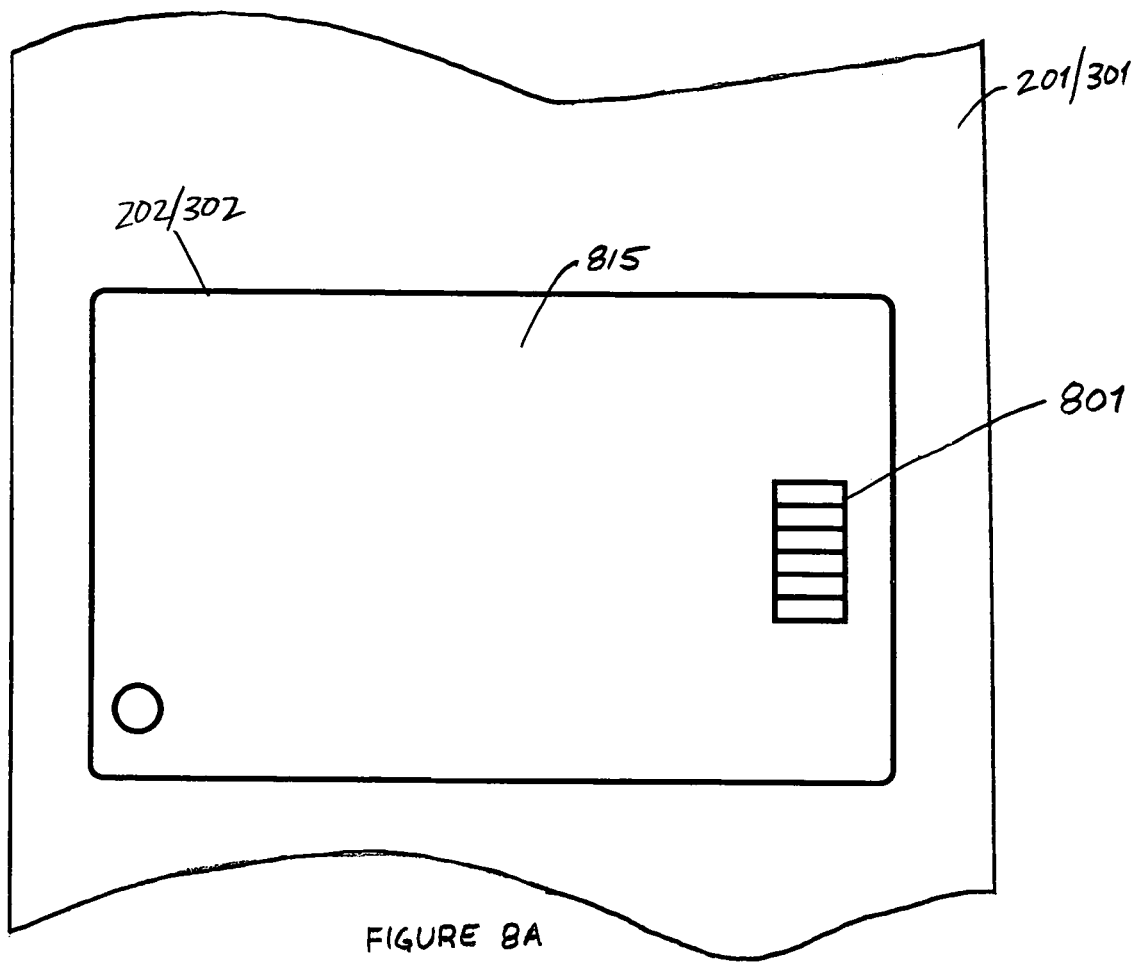
FIG. 8A shows a housing according to an embodiment of the present invention.
Figure 8B:
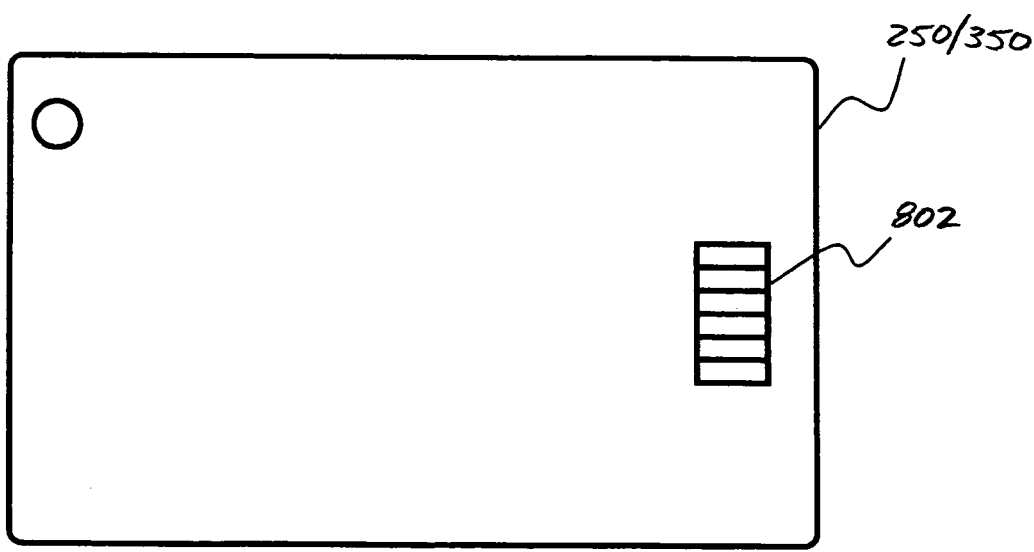
FIG. 8B shows a rear portion of a source according to an embodiment of the present invention.

Referring now to FIGS. 8A and 8B, a wall 815 of the housing 202, 302 bordering the cavity 210, 310 (shown in FIG. 8A as a back wall 815) includes a pin array 801 for connecting to a pin array 802 located on the media source 250, 350. When the media source 250, 350 is secured to housing 210, 310, the pin array 801 and media source pin array 802 transfer data to and from the media source 250, 350. Thus, the media source can be connected to external devices through the housing 202, 302. The external devices include, for example, a slave video display unit installed in another part of the vehicle, a security system, and a vehicle sound system.

The media source 250, 350 may also be connected to the vehicle's power supply through the housing 202, 302. The housing 202, 302 can be coupled to a vehicle's electrical system and connected to a vehicle's power supply, e.g., 12 Volts, through, for example, a wiring harness. Power can be supplied to the media source 250, 350 through the pin arrays 801 and 802. The housing 202, 302 can also be connected to a vehicle's data communication bus, which can carry data to and from the external devices.

Figure 9:
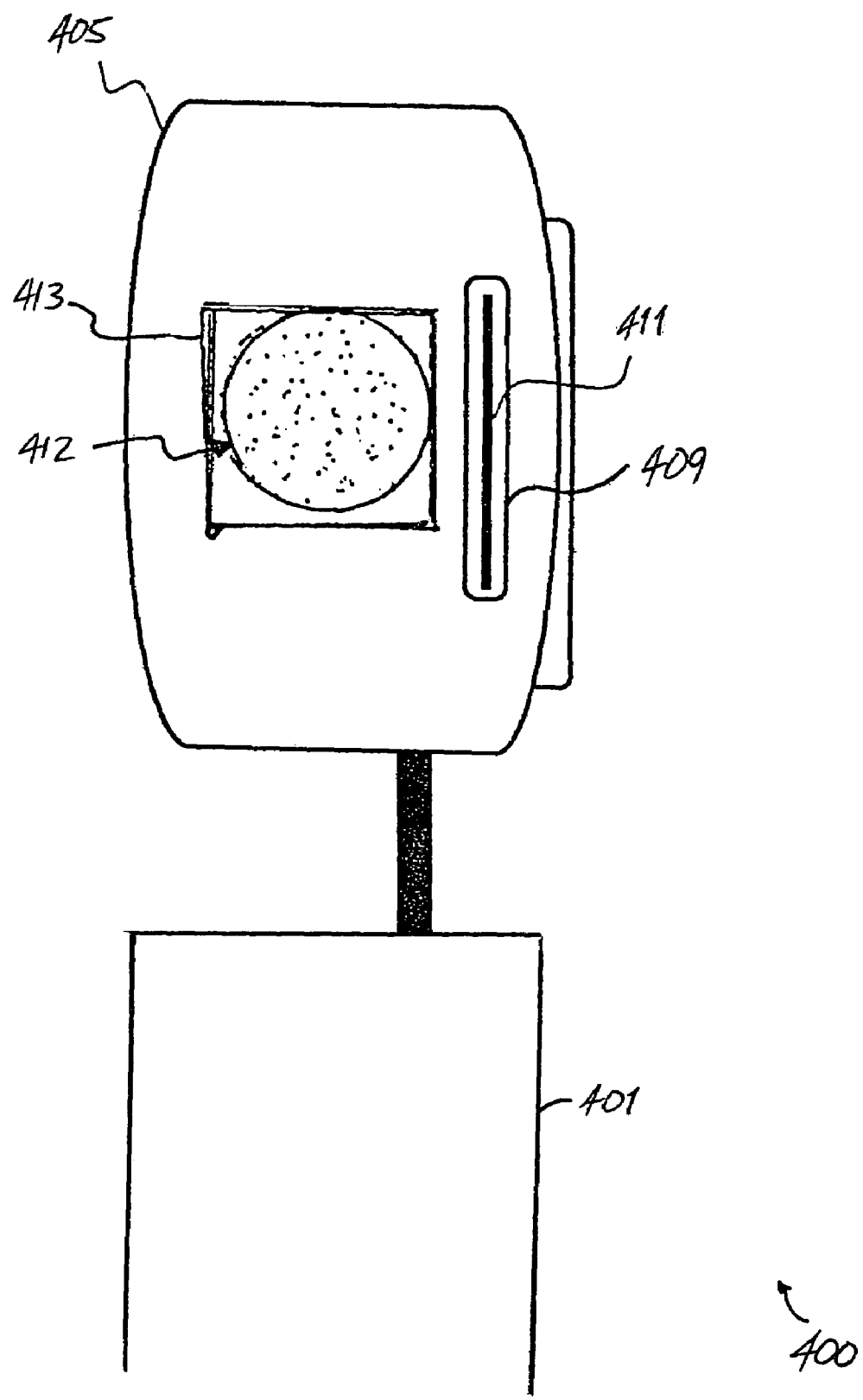
FIG. 9 shows an entertainment system according to an embodiment of the present invention.

Referring to FIG. 9, in an entertainment system 400, a portion of a seat 401, such as the headrest 405, includes an opening 409 for receiving a data media to be inserted in the media source (e.g., media source 250 or 350). The opening 409 aligns with the slot 411 of a media source that has been inserted into a cavity in a housing. The alignment of the opening 409 with the slot 411 allows a data media, such as a DVD or MP3 disk to be inserted into a media source. The opening 409 may be positioned on the side, top, or bottom of the seat 401. The portion of the seat 401 where the media source and slot are located (e.g. the headrest 405 or the main body of the seat) may include vents 412 for dissipating heat and a cooling fan 413 for increasing airflow. The cooling fan 413 can be located behind the vents 412, such that the cooling fan 413 is concealed.

Referring to FIGS. 10A-10D, another embodiment of an entertainment system 500 installed in a vehicle seat 501, wherein a housing 502 for a media source 550 is integrated into the vehicle seat 501, at, for example, the headrest or the main body of the vehicle seat 501. A display 520 is also attached to the housing 502. Like the housings 202 and 302 and media sources 250 and 350, the housing 502 is attached to the seat 501 and the media source 550 is mounted in the housing 502 in the same or similar manner as embodiments shown in FIGS. 3 and 4. The media source 550 may also include any of the devices listed above in connection with the media sources 250 and 350. Further, the housing 502 may include the pin array 801 for mating with a pin array 802 on the media source 550 for transfer of power and/or data.

As shown in FIGS. 10A-10D, a door 530 is connected via a hinge or hinges 532 to the housing 502. The door 530 includes the display 520 formed on a front side thereof. The display 520 can be fixed to the door 530 by, for example, screws, catches, adhesives, molding, pressure fitting, snugly fitting into an open center section of the door 530 bordered by a frame and/or any other means known to those skilled in the art.

The hinge 532, located at a top portion of the door 530, allows the door 530 to pivot away from the housing 502 to expose a cavity 510 for receiving and supporting the media source 550 in the housing 502. The hinge 532 may be positioned at top, bottom or side portions of the door 530 as long the door 530 can be opened to expose the cavity 510 for receiving the media source 550.

Figure 10A:
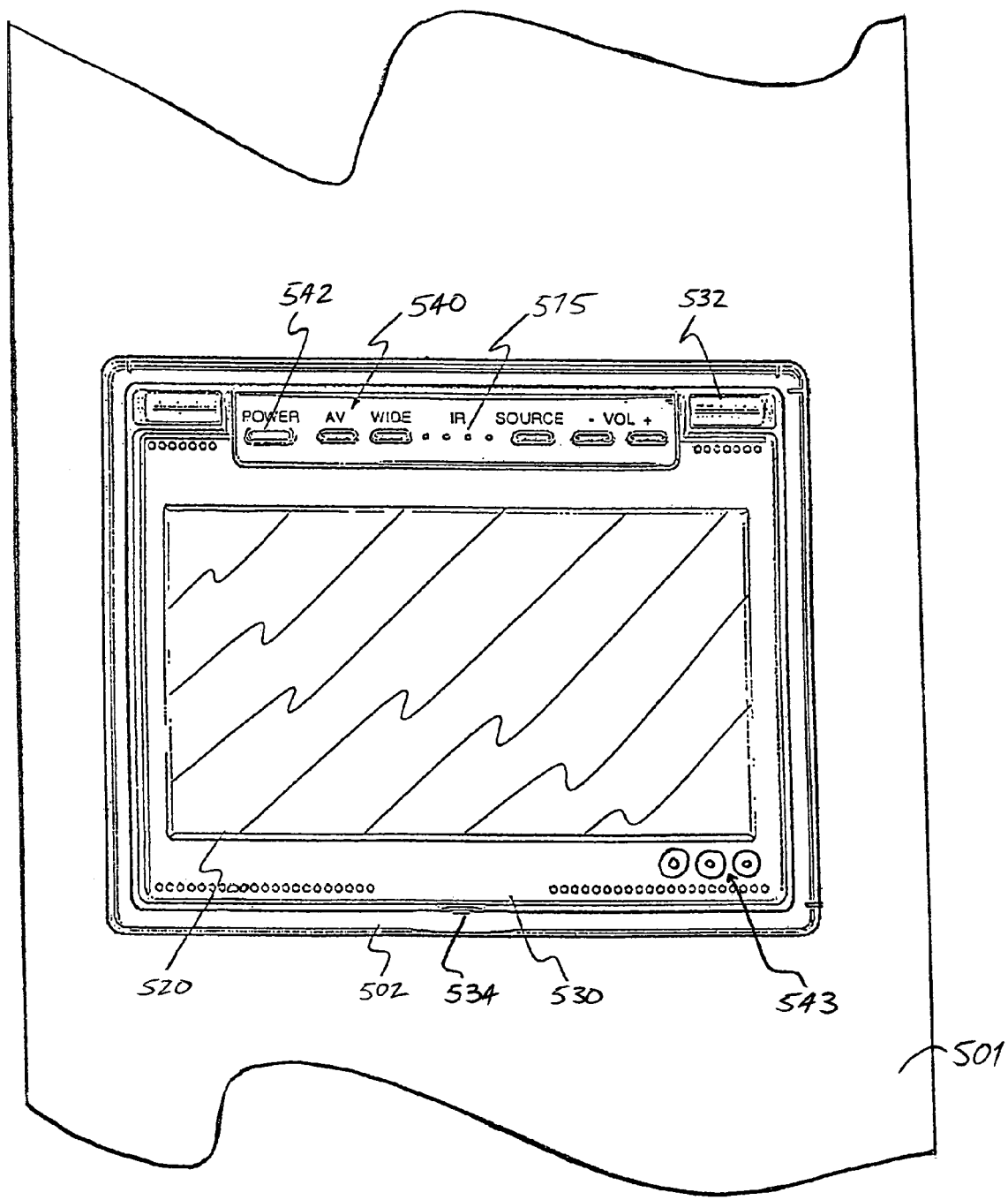
FIGS. 10A-10D show an entertainment system according to an embodiment of the present invention.
Figure 10B:
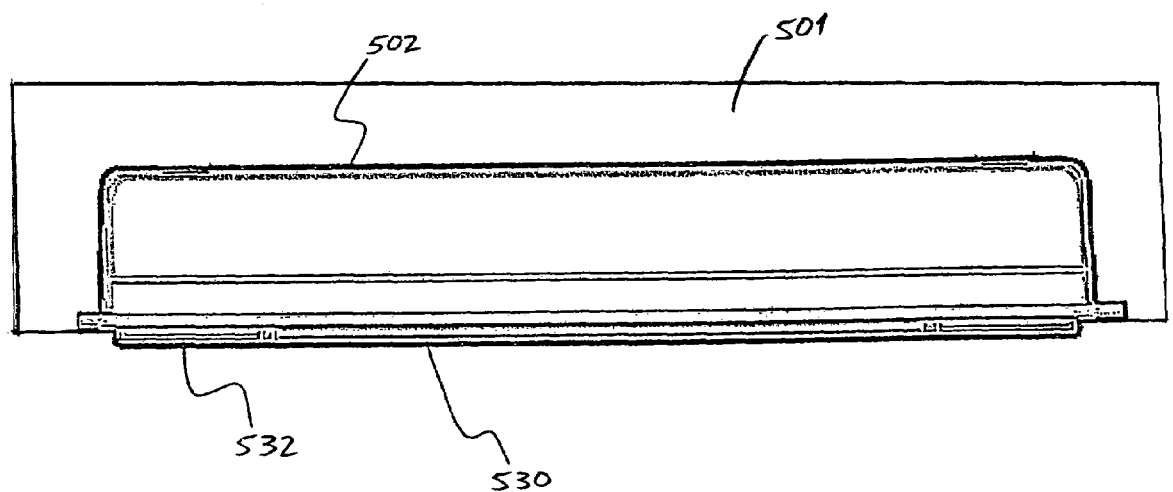
Figure 10C:
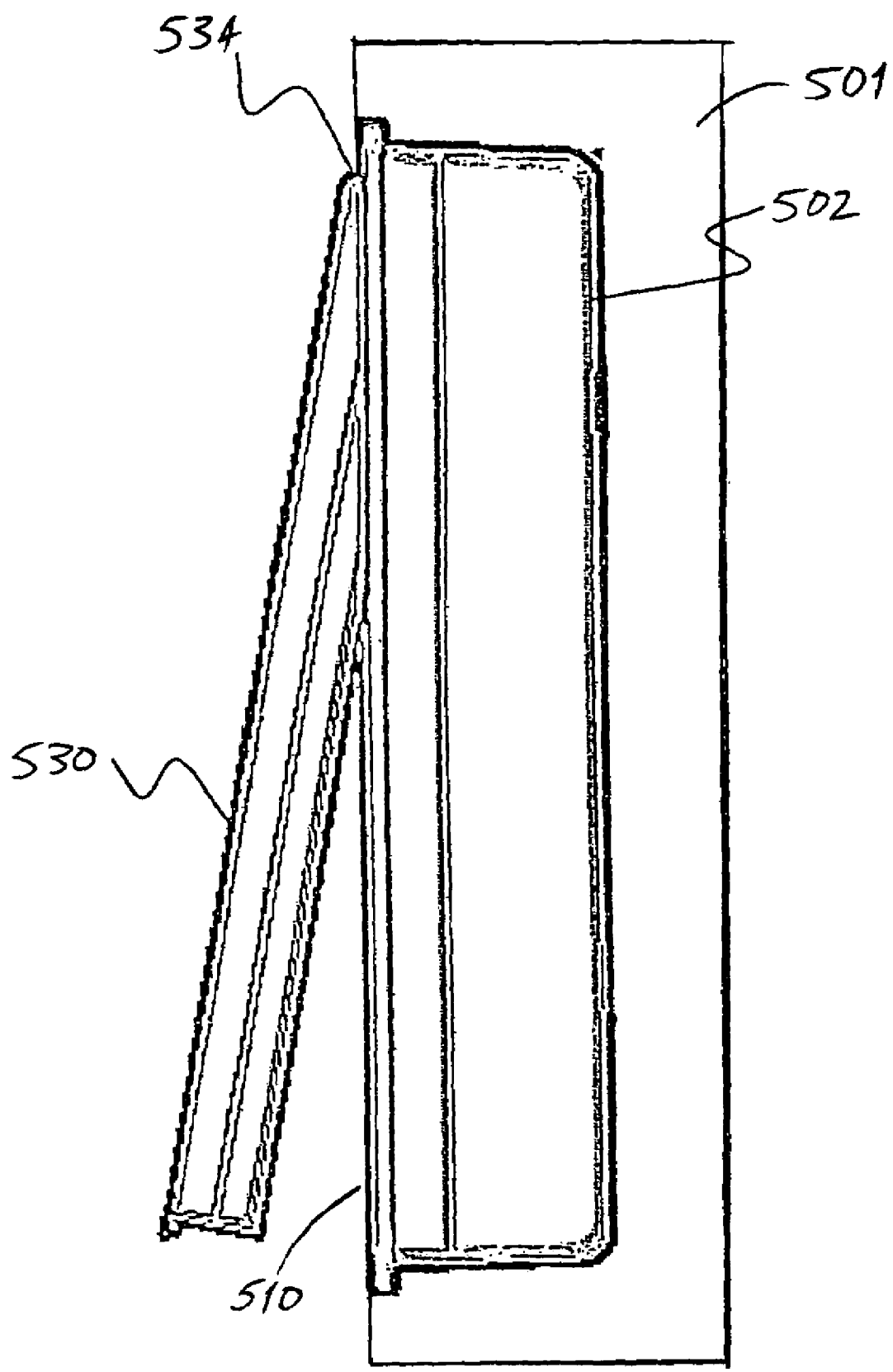
Figure 10D:
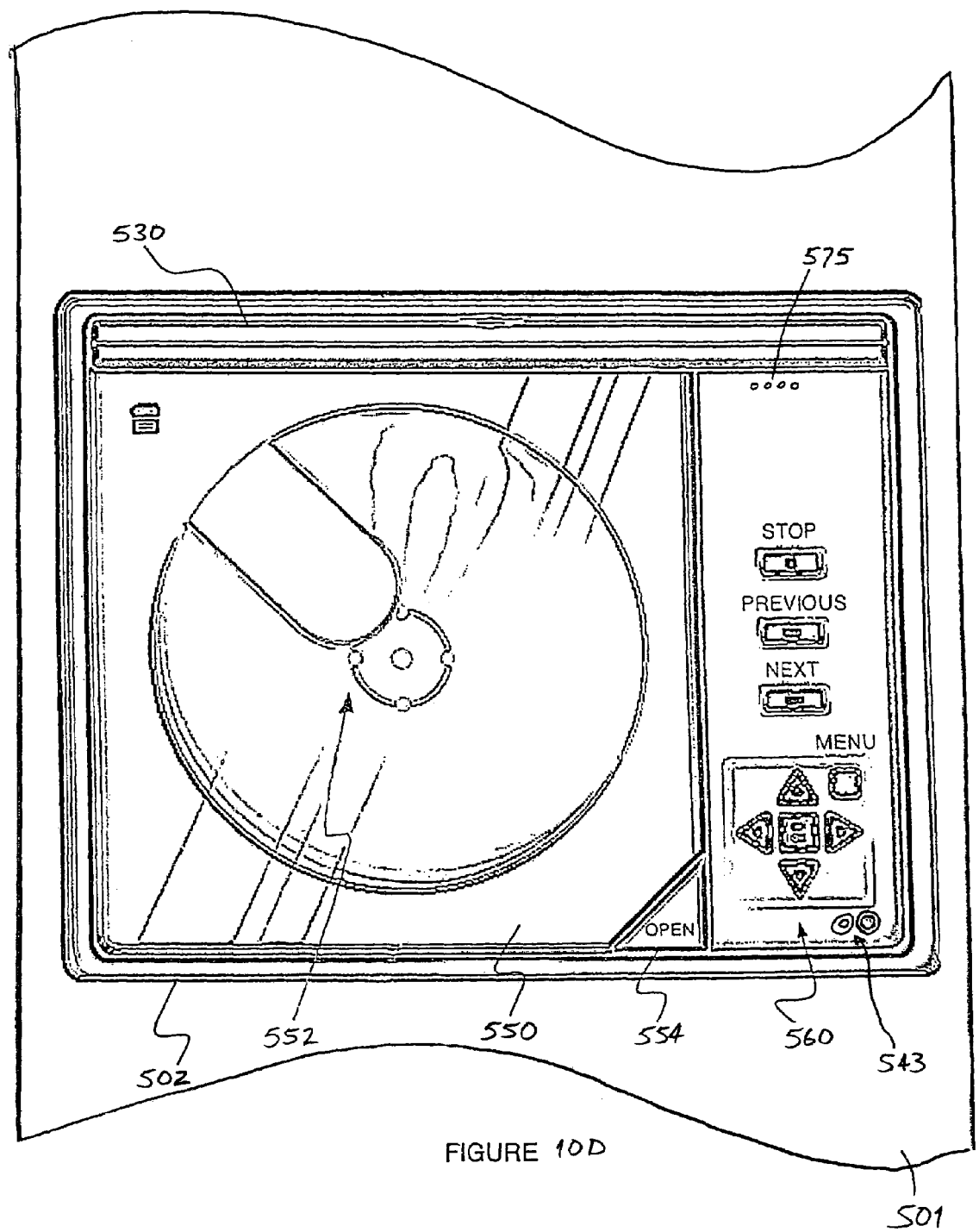

The media source 550 includes a cover 552 that can be opened to allow insertion of a data media, such as a DVD, into the media source 550. The door 530 may be opened, for example, by pulling a tab 534. Alternatively, a button (not shown) may be depressed releasing the door 530 from the housing 502. The cover 552 may be opened, for example, by pulling a tab (not shown) and/or by depressing a button 554 releasing the cover 552 from the entertainment unit 550. The door 530 may be closed by re-engaging the released side of the door 530 with the housing 502. A desired program can be played for viewing while the door 530 is in the closed position. Controls 560 for controlling functions of the media source 550, such as, volume, previous, next, pause, eject, play and power on/off, are shown in FIG. 10D positioned on the media source 550.

The display 520 may be, for example, a liquid crystal display (LCD), a gas plasma display, a light emitting diode (LED) display, an organic LED (OLED) display, or an electro-luminescent display. The display 520 may include a control panel 540 with control buttons 542 for controlling the on screen display characteristics and input and output ports 543 for items such as external devices or headphones. The media source 550 may also include input and output ports positioned thereon.

It is to be appreciated that that a display, such as the display 520, may also be attached to the housings 202, 302, either via a door or directly to the housings using fasteners, screws, catches, molding, snap-fit mechanisms or the like. A display may also be handheld, mounted in another portion of the vehicle away from the seat mounted media source, such as to a wall of the vehicle (e.g. the ceiling of the vehicle), on another seat or on a different portion of the same seat as the media source (e.g., on a headrest, while the media source is positioned on the main body of the seat).

The display can be operatively coupled to the media source directly via wires or some other electrical connectors, or through the housing, via, for example, electrical connectors coupled to the pin array 801.

Transfer of data may be obtained through the pin arrays 801, 802. For example, video data from a DVR media source may be transferred through the pin arrays 801, 802 to a display coupled to the housing for producing a video image on a display screen. Similarly, audio data may be transferred through the pin arrays 801, 802 to a display, speakers and/or headphones coupled to the housing for producing sound associated with a video image. Further, audio data may be sent through the display to speakers or headphones via wired or wireless transmission. Video and audio data may also be transferred to displays, speakers and/or headphones directly from the media source. Audio and/or video data from any of the above described media sources can be transferred via the pin arrays 801, 802 or through some other physical connection, such as wires or through wireless transmission to displays, speakers and/or headphones.

To provide for audio reception through wireless headphones, the display 520 or the media source 550 may include a wireless transmitter 575 for transmitting wireless signals to wireless receivers in wireless headphones via, for example radio frequency (RF) or infrared (IR) signals, using an antenna or optical transmitting device, respectively. The wireless transmitter 575 can be capable of transmitting wireless signals over more than one channel operating at a different frequency for each channel so that interference between more than one wireless headphone user watching different programs can be avoided. Audio may also be provided to vehicle occupants through the existing vehicle audio system or through a speaker mounted in the seat 501 or media source 550.

Figure 12:
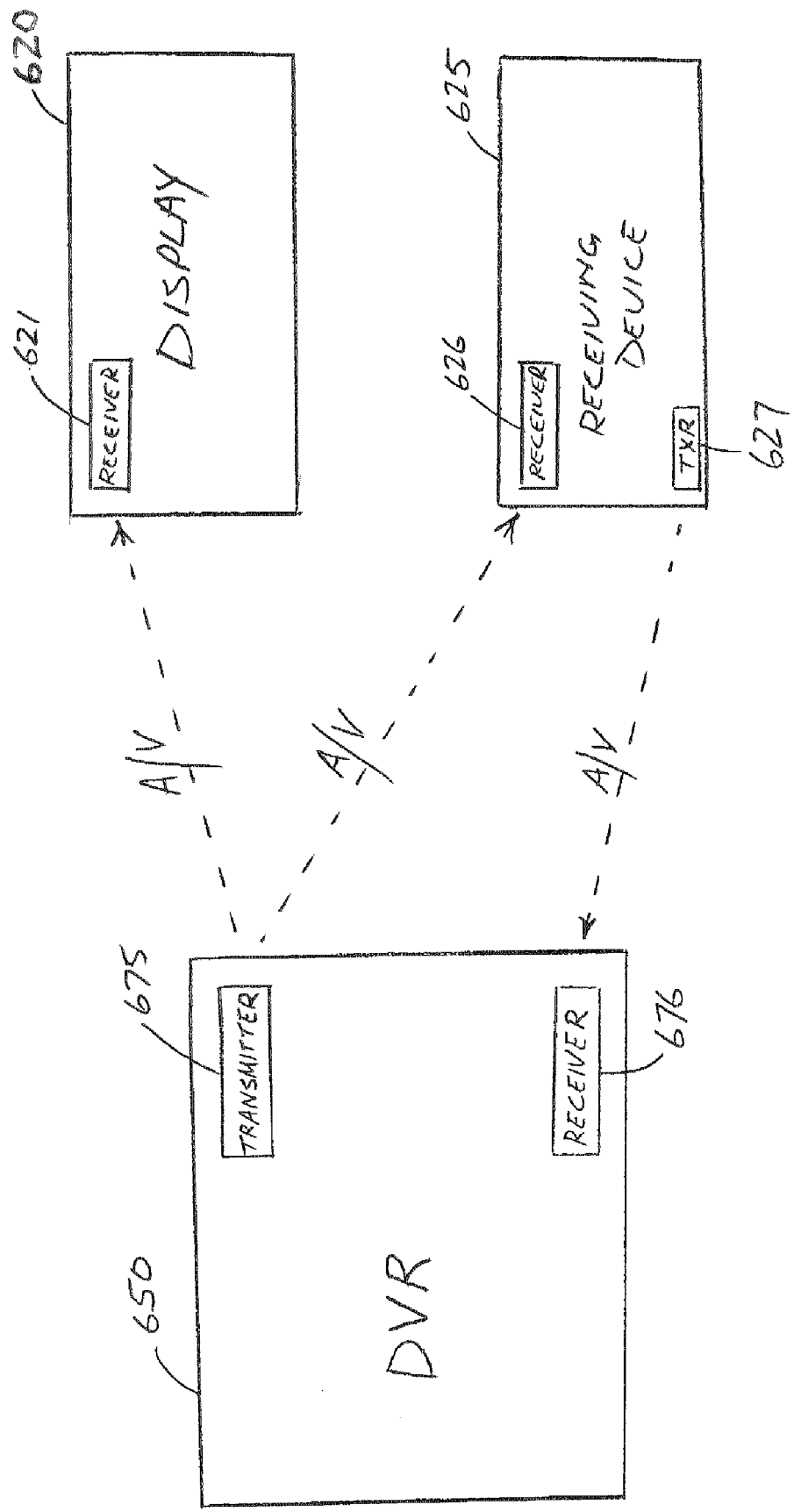
FIG. 12 is a block diagram showing an entertainment system including a digital video recorder (DVR) according to an embodiment of the present invention.

Referring to FIG. 12, a DVR 650 is the media source removably positioned in the housing of a vehicle seat. The DVR 650 is capable of storing multiple programs for selective output to a display 620 and/or to a receiving device 625. The DVR 650 may have a capacity in the range of about 50 to about 150 hours digital audio and video programming, but is not limited as such, and may have more or less capacity. The audio and video programming can include, for example, music including audio only or including both audio and video, movies, video games or the like. The DVR 650 can download and store the audio and video programming from sources such as a local area network (LAN), a wide area network (WAN), a global network, such as the Internet, and television or radio networks, including satellite networks.

The display 620 is preferably an LCD type display, but can be another type of display, such as gas plasma, LED, organic LED (OLED) or electro-luminescent. The display 620 can be attached to same housing as the DVR 650, handheld, or mounted in a portion of the vehicle remote from the DVR 650, such as to a wall of the vehicle (e.g. the vehicle ceiling), on another seat, on a console, or on a different portion of the same seat as the media source.

The receiving device 625 can be, for example, a cellular telephone, personal computer (PC), laptop PC, MP3 player, personal digital assistant (PDA), another DVR, a mass storage device, such as a memory card or a keydrive, a satellite radio, an AM/FM radio, or other device capable of broadcasting, displaying, receiving, downloading and/or storing audio and/or video data.

Audio and video data pertaining to a specific program may be selected for output via a menu of programs appearing on a display 620 and/or a display of the receiving device 625. Audio and video signals formatted for wireless for transmission (e.g., compressed and encoded) are input to a wireless transmitter 675 coupled to the DVR 650 and transmitted to receivers 621 and 626 located in the display 620 and the receiving device 625. Alternatively, audio and video signals from the DVR may be transmitted to the display 620 or to the receiving device 625, via a physical connection, such as the pin arrays 801, 802, or via ports or jacks, such as a universal serial bus (USB) port or an RCA jack.

In an embodiment, the display 620 and the receiving device 625 include components, such as demodulators and decoders to reformat (e.g., decompress) transmitted audio and video data for broadcast. Video and audio data pertaining to multiple programs may be, for example, wirelessly transmitted in a broadcast stream, and a user may select a program for viewing on a display through, for example, a menu displayed on a screen of the display.

In an embodiment, the receiving device 625 includes a transmitter 627 for wirelessly transmitting audio and video data from the receiving device 625 to a receiver 676 coupled to the DVR 650. The DVR 650 can download and store the audio and video data from the receiving device 625 for playback and distribution to, for example, display 620. Audio and video data from the receiving device 625 may also be transferred to the DVR 650 via a physical connection.

Wireless transmission from and to the DVR 650 utilizes radio frequency (RF) and/or infrared (IR) signals. The wireless transmission can be performed in accordance with known techniques, such as Bluetooth®, 802.11 and the like.

Figure 11:
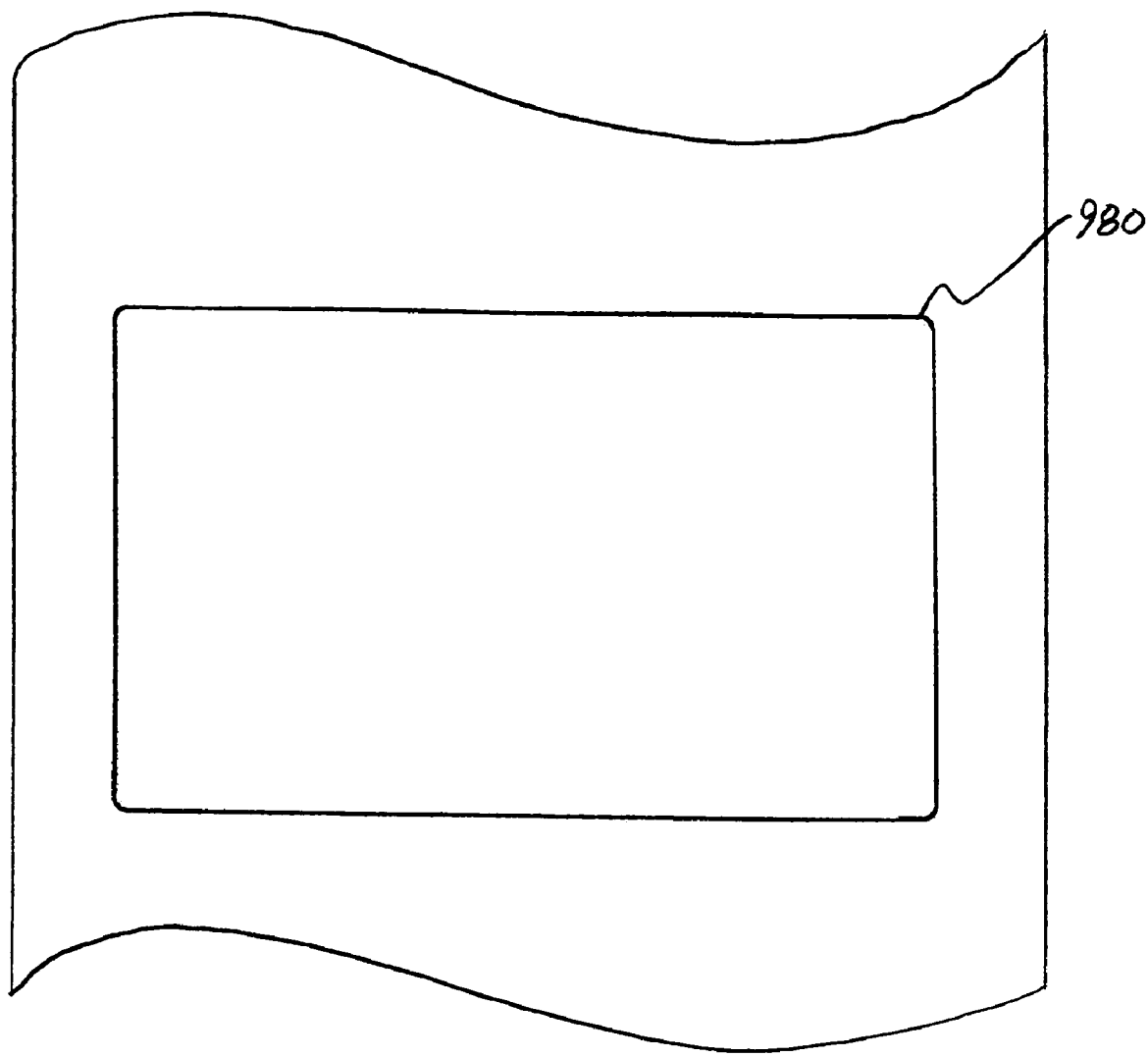
FIG. 11 shows a cover for an entertainment system according to an embodiment of the present invention.

Referring to FIG. 11, when the entertainment systems 200-500 are not in use, a cover 980 can conceal the housing and cavity. The cover 980 is manufactured from a material such as, plastic, wood, leather, vinyl, cloth, and/or aluminum. Depending on the cover material, the cover 980 can be secured by the same mechanisms used to secure the media source to the compartment shown in FIGS. 7A-7D, or with catches, and/or a zipper. The cover 980 and the media source can have one or more features in common, such as openings for receiving latches and the like.

It is to be appreciated that a portable media source according to the present invention is easily removable from and can be operated outside of a vehicle, for example, in home or office environments.

Having described embodiments for a seat mountable video system, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A housing adapted to secure a removable media source to a seat in a vehicle, comprising:
a means for securing the housing to an internal support structure of the seat; and
a means for mounting the removable media source in the housing, wherein the removable media source is mounted in and electrically coupled to the housing, and is separate from a display mounted to the housing, and wherein video data is transferred from the removable media source to an electrical connector formed in the housing for distribution to the display mounted to the housing.

2. The housing of claim 1, wherein the means for securing the housing comprises at least one of a screw, a catch and an adhesive.

3. The housing of claim 1, wherein the means for mounting the removable media source comprises a quick release mechanism.

4. The housing of claim 1, wherein the means for mounting the removable media source comprises a flexible coupling mechanism including concave and convex portions.

5. The housing of claim 1, wherein the means for mounting the removable media source comprises a loop and hook fastener.

6. The housing of claim 1, wherein the means for mounting the removable media source comprises a snap.

7. The housing of claim 1, wherein the removable media source includes at least one of a DVD player, a CD-ROM player, a video game player, a videocassette player, a television tuner, a radio tuner, a wireless receiver, an MP3 player, a digital video recorder, and a device for playing media supplied from a mass storage device.

8. The housing of claim 1, wherein the housing is mounted in one of a headrest and a main body of the seat.

9. The housing of claim 1, further comprising another display operatively coupled to the removable media source, wherein the other display is one of handheld and mounted at a location in the vehicle away from the housing.

10. The housing of claim 9, wherein the other display is operatively coupled to the removable media source via at least one of a direct connection, a connection through the housing and a wireless connection.

11. The housing of claim 1, wherein power is provided to the removable media source from a power source coupled to the housing.

12. The housing of claim 1, wherein audio data is transferred from the removable media source to the housing for distribution to at least one of at least one speaker and at least one headphone set.

13. The housing of claim 1, wherein the media source wirelessly transmits at least one of audio and video data to a receiving device capable of downloading and storing at least one of the audio and video data.

14. An entertainment system for a vehicle comprising:
a media source; and
a housing for supporting the media source, wherein at least a portion of the housing is mounted in a vehicle seat, the media source is capable of being selectively mounted in and removed from the housing, and the media source mounted in the housing transmits audio and video data via wireless transmission to a receiver located within the vehicle.

15. The entertainment system of claim 14, wherein the receiver is coupled to a display device.

16. The entertainment system of claim 15, wherein the audio and video data includes at least two media programs transmitted in a broadcast stream.

17. The entertainment system of claim 16, wherein selection of one of the at least two media programs is made from a menu displayed on the display device.

18. The entertainment system of claim 14, wherein the media source is capable of downloading and storing audio and video data.

19. The entertainment system of claim 14, wherein the receiver is coupled to a receiving device including one of a cellular telephone, a personal computer, an MP3 player, a personal digital assistant, a digital video recorder, and a mass storage device.

20. The entertainment system of claim 19, wherein the media source and the receiving device are each capable of downloading and storing at least one of the audio and video data.

21. The entertainment system of claim 20, wherein the audio and video data includes at least two media programs transmitted to the receiving device in a broadcast stream.

22. The entertainment system of claim 21, wherein selection of one of the at least two media programs is made from a menu displayed on the receiving device.

23. The entertainment system of claim 19, wherein at least one of audio and video data is capable of being transmitted to the media source from the receiving device.

24. The entertainment system of claim 23, wherein the media source and the receiving device are each capable of downloading and storing at least one of the audio and video data.

25. The entertainment system of claim 23, wherein the audio and video data received by the media source from the receiving device is transmitted to a display device from the media source.

26. A housing adapted to secure a removable media source to a seat in a vehicle, comprising:
a means for securing the housing to the seat; and
a means for mounting the removable media source in the housing, wherein the removable media source is mounted in and electrically coupled to the housing and video data is transferred from the removable media source to an electrical connector formed in the housing for distribution to a display mounted away from the housing.

27. The housing of claim 26, wherein the means for securing the housing comprises at least one of a screw, a catch and an adhesive for engaging an internal support structure of the seat.

28. The housing of claim 26, wherein the means for securing the housing comprises at least one of an adhesive, a rivet or a loop and hook fastener for engaging a portion of upholstery of the seat.

29. The housing of claim 26, wherein the means for mounting the removable media source comprises a quick release mechanism.

30. The housing of claim 26, wherein the means for mounting the removable media source comprises a flexible coupling mechanism including concave and convex portions.

31. The housing of claim 26, wherein the means for mounting the removable media source comprises a loop and hook fastener.

32. The housing of claim 26, wherein the removable media source includes at least one of a DVD player, a CD-ROM player, a video game player, a videocassette player, a television tuner, a radio tuner, a wireless receiver, an MP3 player, a digital video recorder, and a device for playing media supplied from a mass storage device.

33. The housing of claim 26, wherein the housing is mounted in one of a headrest and a main body of the seat.

34. An entertainment system comprising:
a media source including a data media receiving portion;
a housing for supporting the media source, wherein at least a portion of the housing is mounted in a vehicle seat, and the media source is capable of being selectively connected to and disconnected from the housing; and
a display device mounted to the housing, wherein the media source including the data media receiving portion is positioned behind the display device.

* * * * *